(12) United States Patent
Oh et al.

(10) Patent No.: US 8,169,677 B2
(45) Date of Patent: May 1, 2012

(54) SCANNER MOTOR

(75) Inventors: Song-Bon Oh, Suwon-si (KR);
Sang-Jae Song, Suwon-si (KR)

(73) Assignee: Yong-Nam Eom, Gyeonggi-Do (KR)

( * ) Notice: Subject to any disclaimer, the term of this patent is extended or adjusted under 35 U.S.C. 154(b) by 106 days.

(21) Appl. No.: 12/761,775

(22) Filed: Apr. 16, 2010

(65) Prior Publication Data

US 2011/0116146 A1    May 19, 2011

(30) Foreign Application Priority Data

Nov. 19, 2009  (KR) .......................... 10-2009-0112191

(51) Int. Cl.
*G02B 26/08* (2006.01)
(52) U.S. Cl. .................................................. 359/200.1
(58) Field of Classification Search ............... 359/200.1, 359/216.1–218.1
See application file for complete search history.

(56) References Cited

U.S. PATENT DOCUMENTS

2008/0260312 A1* 10/2008 Nishino et al. ................ 384/446

* cited by examiner

*Primary Examiner* — Euncha Cherry
(74) *Attorney, Agent, or Firm* — McDermott Will & Emery LLP

(57) ABSTRACT

A scanner motor is disclosed. In accordance with an embodiment of the present invention, the scanner motor includes a shaft, a housing having an insertion-hole formed in a center thereof, in which the shaft is inserted into the insertion-hole, a polygonal mirror, which is mounted on an upper side of the housing and has a through-hole formed in a center thereof in such a way that the shaft penetrates through the polygonal mirror, and a compression spring, which is formed on an upper side of the polygonal mirror and includes a V-shaped curved part bent downwardly in such a way that the V-shaped curved part compresses an upper edge of an inner circumferential surface of the polygonal mirror both horizontally and vertically.

3 Claims, 5 Drawing Sheets

SCANNER MOTOR

CROSS-REFERENCE TO RELATED APPLICATIONS

This application claims the benefit of Korean Patent Application No. 10-2009-0112191, filed with the Korean Intellectual Property Office on Nov. 19, 2009, the disclosure of which is incorporated herein by reference in its entirety.

BACKGROUND

1. Technical Field

The present invention is related to a scanner motor.

2. Description of the Related Art

In an optical scanning device typically employed in, for example, a laser beam printer, the most important part is the scanner motor that rotates a polygonal mirror, which is provided for total reflection of a laser beam toward a photosensitive drum, at a high speed. Illustrated in FIG. 1 is a conventional scanner motor, which has a similar configuration to a small spindle motor employed in a small precision device.

Specifically, a shaft 1 is inserted in the center of a sleeve (not shown) to rotate, and a housing 4 is fitted on an upper end part of the shaft 1. Then, a polygonal mirror 3 is mounted firmly on an upper part of the housing 4. In order to fix the polygonal mirror 3, a compression spring 2 compresses the upper surface of the polygonal mirror 3.

In this state, if a rotational force is generated through an electromagnetic interaction between a magnet 5 and a coil 6, the generated rotational force is transferred to the housing 4 and the polygonal mirror 3 through the shaft 1 to rotate the polygonal mirror 3. Then, a laser beam is beamed to and reflected by the rotating polygonal mirror 3.

Meanwhile, the most important factor in a scanner motor is that the polygonal mirror 3 coupled to the housing 4 operate stably when the shaft 1 rotates. Specifically, even a small displacement of the polygonal mirror 3 may distort the reflection angle of the laser beam when the polygonal mirror 3 operates, deteriorating the printing property.

In the conventional technology, as illustrated in FIG. 1, a reflection surface 3a of the polygonal mirror 3 is close to a compression force acting point P of the compression spring 2, and thus the compression force of the compression spring 2 can also be applied to the reflection surface 3a of the polygonal mirror 3, distorting the reflection surface 3a. If the reflection surface 3a is distorted, a laser beam scanned to the polygonal mirror 3 may be reflected in an unpredictable direction, causing the deterioration of the printing property.

SUMMARY

The present invention provides a scanner motor that is suitable for high-speed rotation because the change in balance is reduced by preventing a polygonal mirror from being displaced by vibrations or shocks.

The present invention also provides a scanner motor that does not deteriorate the printing property by minimizing the distortion of the original shape of a reflection surface caused by the force of a spring.

An aspect of the present invention provides a scanner motor that includes a shaft, a housing having an insertion-hole formed in a center thereof, in which the shaft is inserted into the insertion-hole, a polygonal mirror, which is mounted on an upper side of the housing and has a through-hole formed in a center thereof in such a way that the shaft penetrates through the polygonal mirror, and a compression spring, which is formed on an upper side of the polygonal mirror and includes a V-shaped curved part bent downwardly in such a way that the V-shaped curved part compresses an upper edge of an inner circumferential surface of the polygonal mirror both horizontally and vertically.

A hole can be formed in a center of the compression spring in such a way that the shaft can be inserted into the compression spring, and a burring part can be formed on an inner circumferential surface of the hole, in which the burring part is bent upward to fit snugly around the shaft.

The compression spring can include a ring-shaped outer member, an inner member, which is disposed inside the outer member and has the burring part, and a plurality of bridges, which connect the outer member and the inner member to each other and are bent downwardly in a "V" shape.

An inclined surface can be formed on an upper edge of a circumferential surface of the polygonal mirror in such a way that the polygonal mirror can be in surface contact with the V-shaped curved part.

Additional aspects and advantages of the present invention will be set forth in part in the description which follows, and in part will be obvious from the description, or may be learned by practice of the invention.

DETAILED DESCRIPTION

Figure 1:
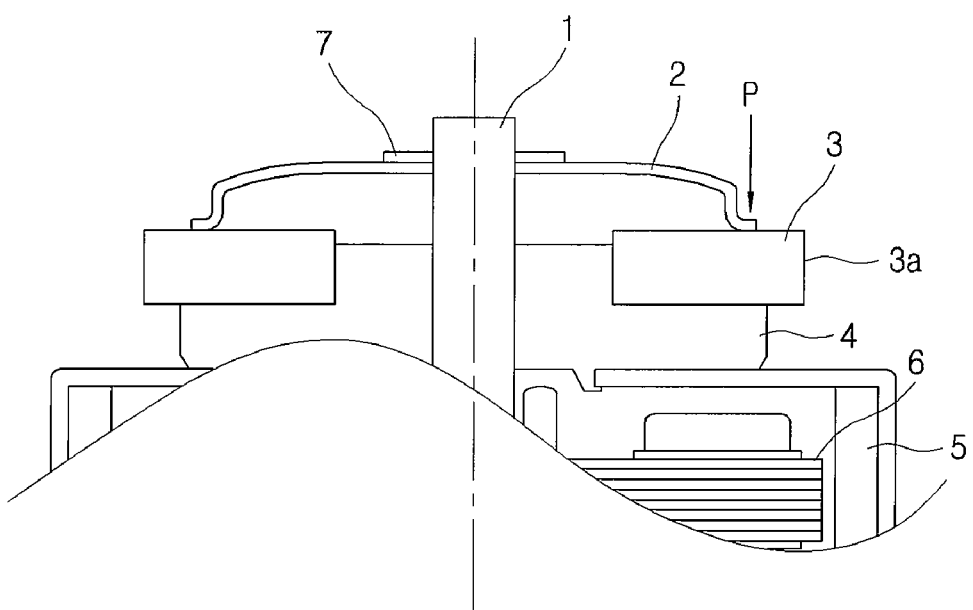
FIG. 1 is a cross-sectional view of a conventional scanner motor.

As the invention allows for various changes and numerous embodiments, a particular embodiment will be illustrated in the drawings and described in detail in the written description. However, this is not intended to limit the present invention to a particular mode of practice, and it is to be appreciated that all changes, equivalents, and substitutes that do not depart from the spirit and technical scope of the present invention are encompassed in the present invention. In the description of the present invention, certain detailed descriptions of related art are omitted when it is deemed that they may unnecessarily obscure the essence of the invention.

A scanner motor according to a certain embodiment of the present invention will be described below in more detail with reference to the accompanying drawings. Those components that are the same or are in correspondence are rendered the same reference numeral regardless of the figure number, and redundant descriptions are omitted.

Figure 2:
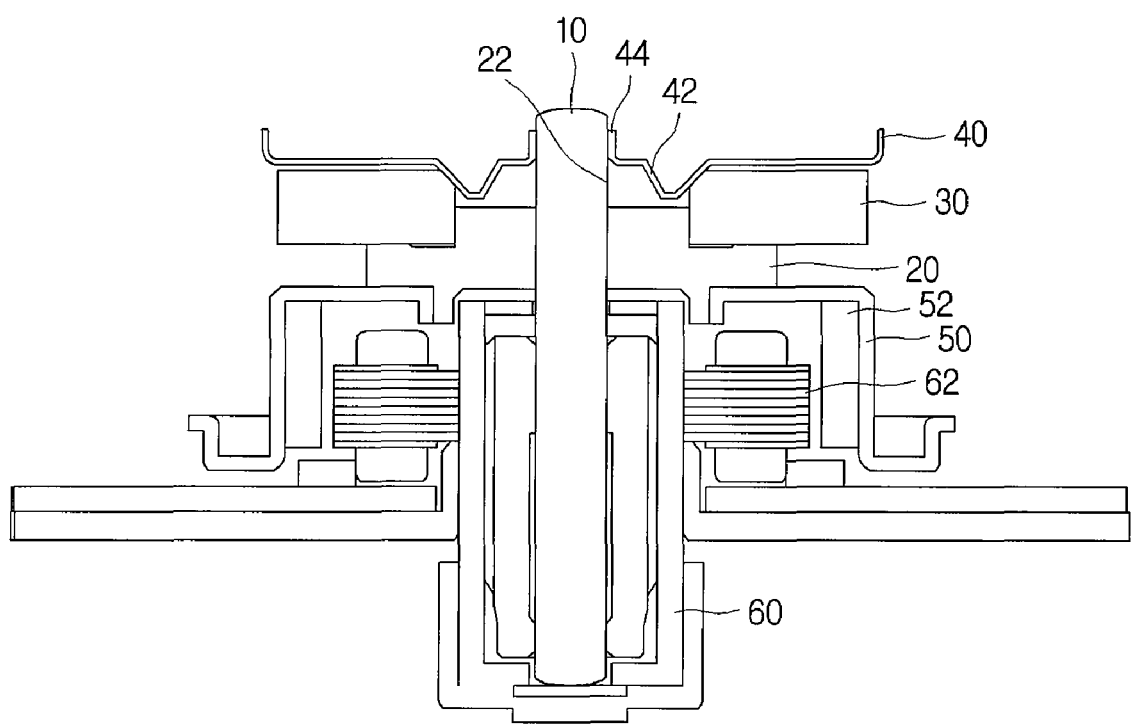
FIG. 2 is a cross-sectional view of a scanner motor in accordance with an embodiment of the present invention.

FIG. 2 is a cross-sectional view of a scanner motor in accordance with an embodiment of the present invention. In a scanner motor of the present embodiment, as illustrated in FIG. 2, a compression spring 40, which is provided on an upper side of a polygonal mirror 30, has a V-shaped curved part 42 bent downwardly that compresses the edge of the inner circumferential surface of the polygonal mirror 30 both horizontally and vertically. Through this structure, the precision of the reflection surface of the polygonal mirror 30 can be maintained, and at the same time, the scanner motor can be fixed without being displaced by vibrations or shocks. In the following description, the structure of a scanner motor in accordance with an embodiment of the present invention will be described in more detail by referring to FIGS. 2 to 5.

A shaft 10 is inserted into the center of a cylinder-shaped sleeve 60, a rotor 50 and a housing 20. For this, the sleeve 60 is formed in the shape of a cylinder, and an insertion hole 22 into which the shaft 10 is inserted is formed in the center of the housing 20. The polygonal mirror 30 is firmly mounted on an upper side of the housing 20, and a through-hole 32 is formed in the center of the polygonal mirror 30 in such a way that the shaft 10 can penetrate through the polygonal mirror 30.

A bottom part of the housing 20 is coupled to the rotor 50, which also has a hole formed in the center such that the shaft 10 can be inserted into the center of the rotor 50. A magnet 52 is coupled to an outermost inner circumference of the rotor 50 and generates a rotational force through an interaction between the magnet 52 and a stator assembly 62 provided on an outer circumference of the sleeve 60. The stator assembly 62 includes a core and a coil wound on the core.

Based on this structure, the rotor 50, the shaft 10, the housing and the polygonal mirror 30 can rotate together at the same time by the rotational force generated by the electromagnetic interaction between the magnet 52 and the stator assembly 62, and at this time, a laser beam can be scanned to and reflected by the rotating polygonal mirror 30.

Although the present embodiment presents a structure in which the magnet 52 is provided to the rotor 50 and a coil is provided to the stator assembly 62, it shall be apparent that the present invention is not limited to this embodiment, and the inverse coupling thereof is also possible.

The compression spring 40 is installed on an upper side of the polygonal mirror 30 and compresses the polygonal mirror 30. Here, a V-shaped curved part 42 that is bent downwardly is provided to the compression spring 40, and the V-shaped curved part 42 compresses the edge of the inner circumferential surface of the polygonal mirror 30 both horizontally and vertically.

By compressing the edge of the inner circumferential surface of the polygonal mirror 30 both horizontally and vertically through the use of the V-shaped curved part 42 bent downwardly, the polygonal mirror 30 can be fixed more stably without deforming an outer surface (that is, a reflection surface 36 shown in FIG. 3) of the polygonal mirror 30. Moreover, through the downwardly curved V-shaped structure, the centrifugal force created by the rotation of the polygonal mirror 30 can be added to the compression force, and thus a more stable fixing structure can be provided.

Figure 3:
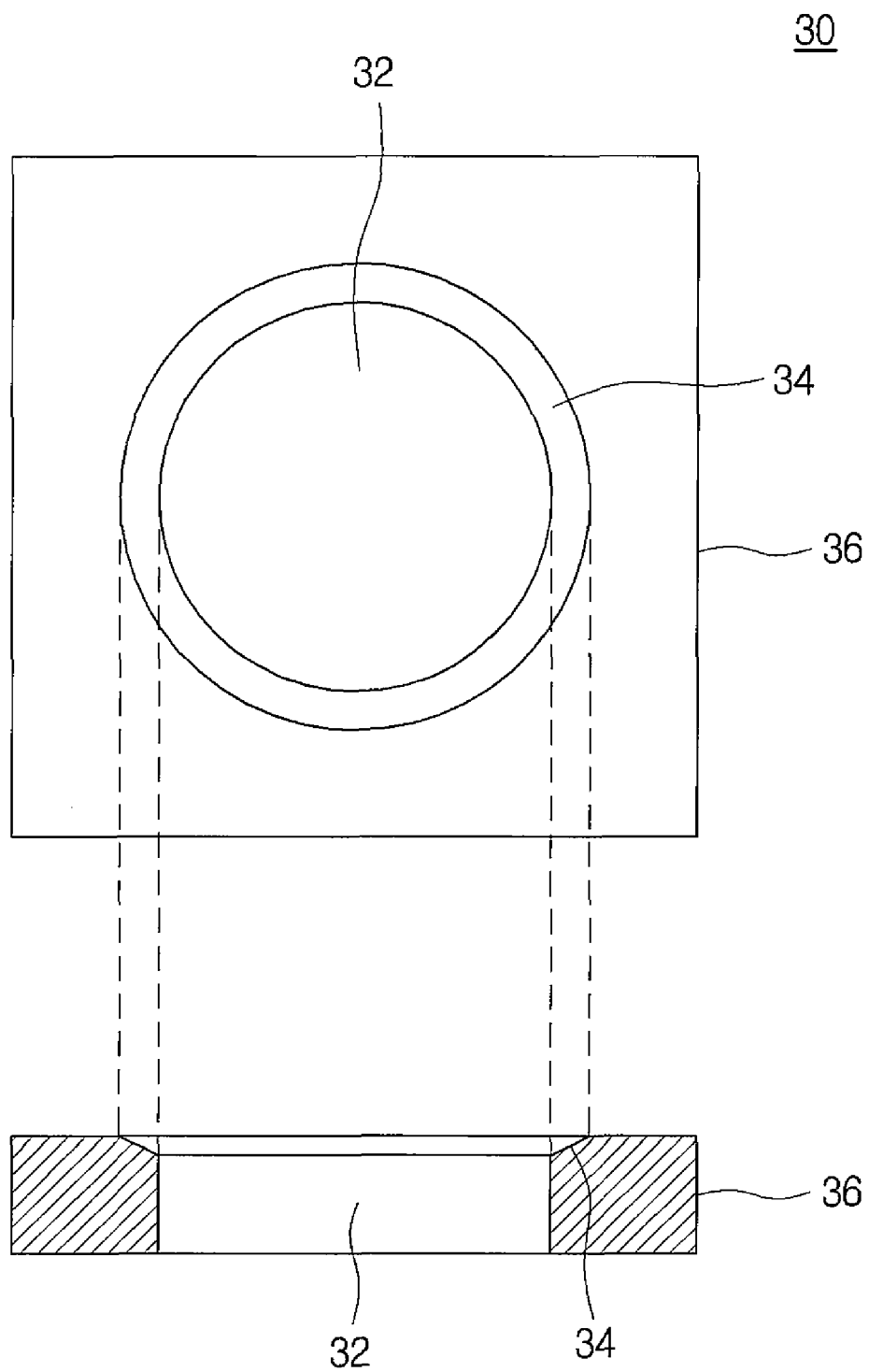
FIG. 3 illustrates a polygonal mirror of FIG. 2.

As illustrated in FIG. 3, an inclined surface 34 can be formed on the edge of the upper circumferential surface of the polygonal mirror 30 so that the polygonal mirror 30 can be in surface contact with the V-shaped curved part 42. By forming the inclined surface 34 on the edge of the upper circumferential surface of the polygonal mirror 30, the downwardly bent V-shaped curved part 42 can be in surface contact with the polygonal mirror 30, and thus the compression load of the compression spring 40 can be prevented from being concentrated at a particular point of the polygonal mirror 30.

A hole 46 (shown in FIG. 4) is formed in the center of the compression spring 40 in such a way that the shaft 10 can be inserted into the center of the compression spring 40, and a burring part 44 that is bent upward to fit snugly around the shaft 10 can be formed on an inner circumferential surface of the hole 46. By forming the bent burring part 44 in the center of the compression spring 40, no additional holder 7 (shown in FIG. 1) is needed to secure the fastening between the compression spring 40 and the shaft 10.

Figure 4:
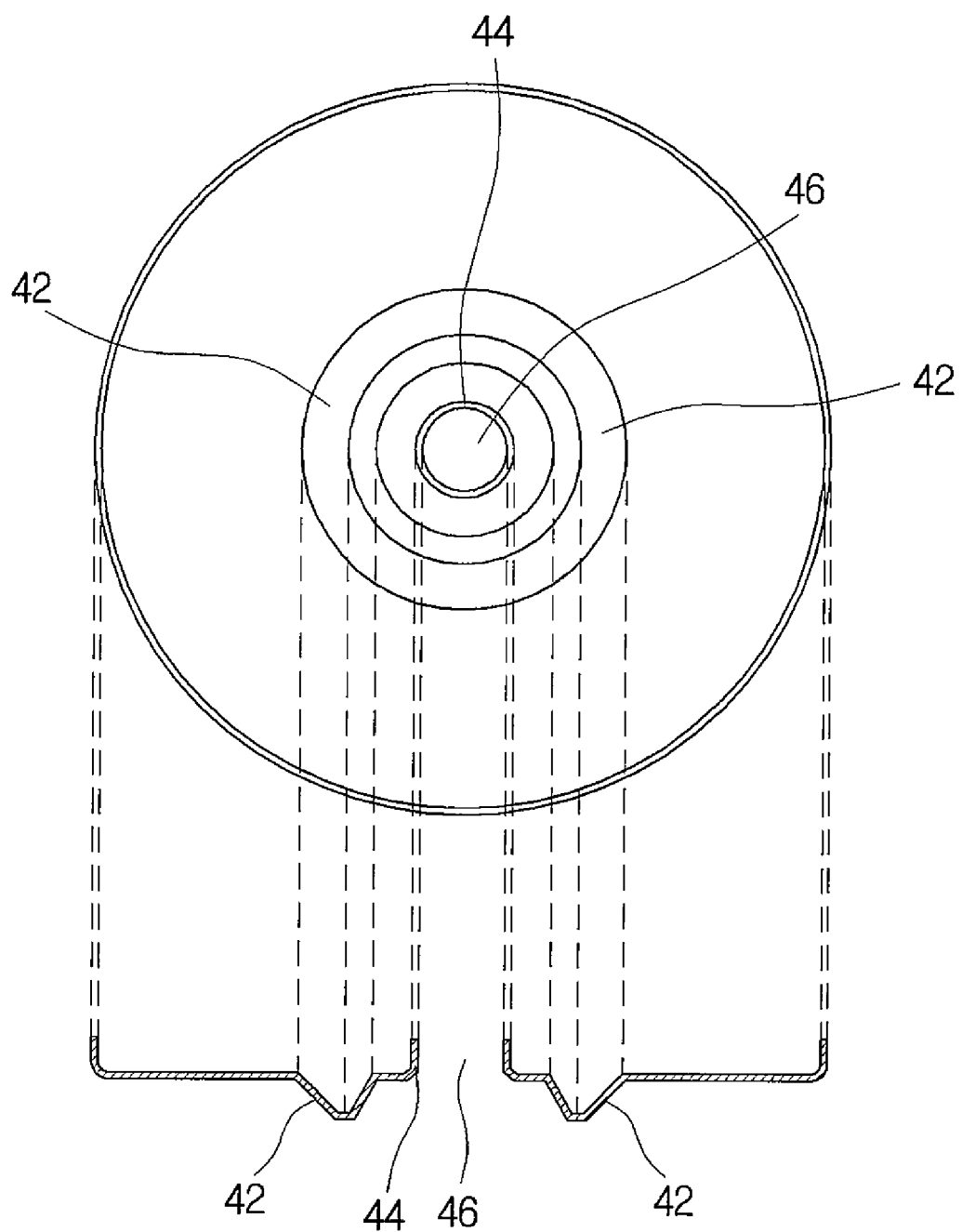
FIG. 4 illustrates a compression spring of FIG. 2.
Figure 5:
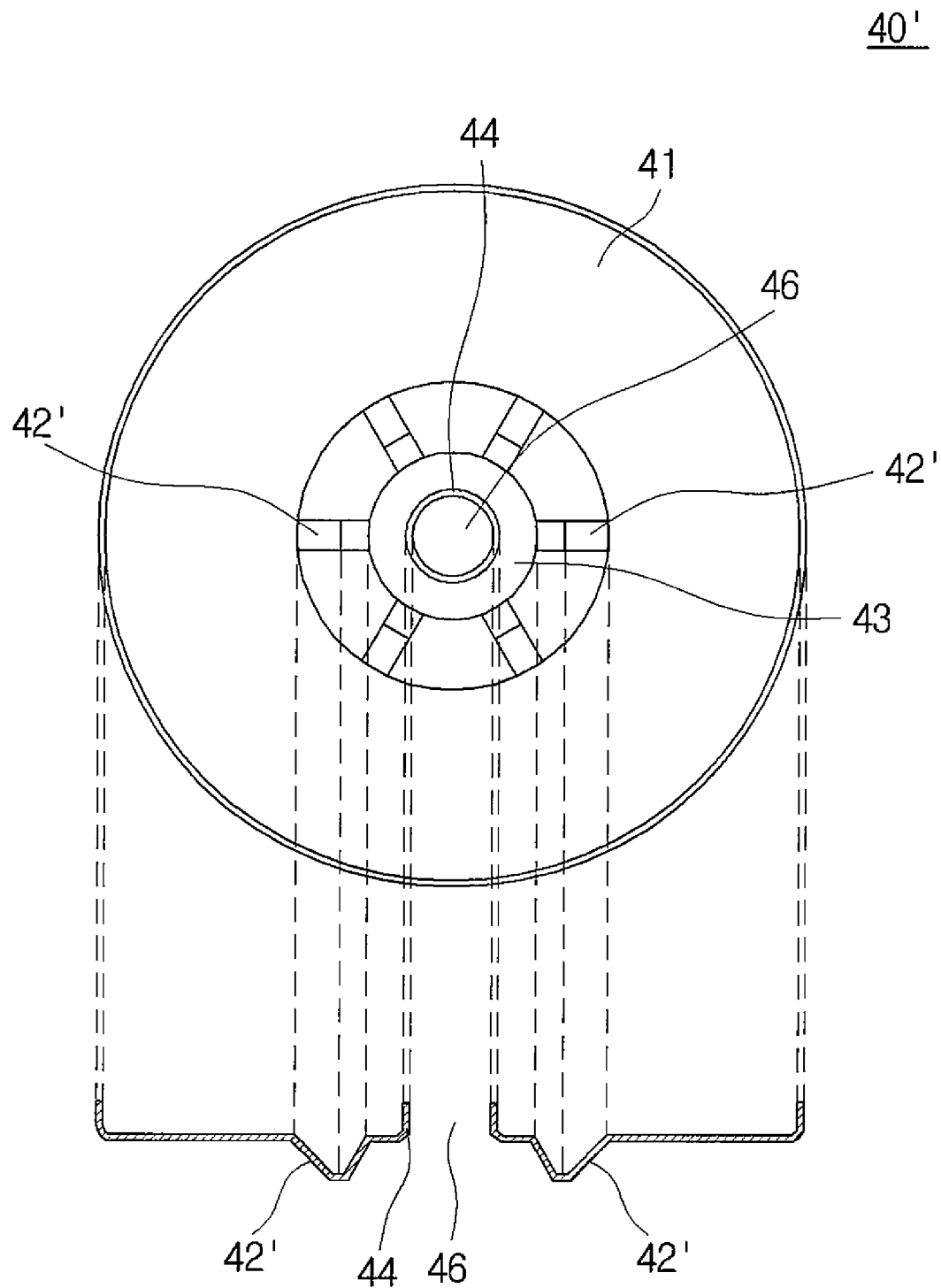
FIG. 5 illustrates another example of a compression spring.

The V-shaped curved part formed on the compression spring 40 can be formed in the shape of a ring having the same center as the compression spring 40, as illustrated in FIG. 4, or can be formed in the shape of a plurality of bridges 42', as illustrated in FIG. 5. Specifically, in the case of FIG. 5, the compression spring 40' includes a ring-shaped outer member 41, an inner member 43, which is disposed inside the outer member 41 and has the burring part 44, and a plurality of bridges 42', which connect the outer member 41 and the inner member 43 to each other and are bent downwardly in a "V" shape.

In the case of the structure having the plurality of bridges 42' shown in FIG. 5, easier management is possible because a finite number of V-shaped curved parts are provided. By adjusting the number and width of the V-shaped curved parts, in addition to the material and thickness of the compression spring, a compression spring with desired properties, for example, compression load, can be obtained.

According to an embodiment of the present invention, a polygonal mirror is fixed because a compression force is applied in vertical and horizontal directions to the edge of the inner circumferential surface of the polygonal mirror where the polygonal mirror is in contact with a V-shaped curved part of a compression spring. This arrangement can make it possible to obtain a maximum distance between a reflection surface of the polygonal mirror and a contact part of the compression spring.

Therefore, the flatness of the reflection surface of the polygonal mirror can be prevented from being distorted, and at the same time, the polygonal mirror can be prevented from being displaced by vibrations and shocks. This especially reduces the change in balance, and thus a scanner motor that is suitable for high-speed rotation can be provided.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

As such, many embodiments other than that set forth above can be found in the appended claims.

What is claimed is:

1. A scanner motor comprising:
    a shaft;
    a housing having an insertion-hole formed in a center thereof, the shaft being inserted into the insertion-hole;
    a polygonal mirror mounted on an upper side of the housing and having a through-hole formed in a center thereof in such a way that the shaft penetrates through the polygonal mirror; and
    a compression spring positioned on an upper side of the polygonal mirror and comprising a V-shaped curved part bent downwardly in such a way that the V-shaped curved part compresses an upper edge of an inner circumferential surface of the polygonal mirror both horizontally and vertically,
    wherein an inclined surface is formed on an upper edge of a circumferential surface of the polygonal mirror in such a way that the polygonal mirror can be in surface contact with the V-shaped curved part.

2. The scanner motor of claim 1, wherein a hole is formed in a center of the compression spring in such a way that the shaft can be inserted into the compression spring, and a burring part is formed on an inner circumferential surface of the hole, the burring part being bent upward to fit snugly around the shaft.

3. The scanner motor of claim 2, wherein the compression spring comprises: a ring-shaped outer member; an inner member being disposed inside the outer member and having the burring part; and a plurality of bridges connecting the outer member and the inner member to each other and bent downwardly in a "V" shape.

* * * * *